United States Patent [11] 3,602,433

| [72] | Inventor | Oden Proctor<br>3010 Evans Wood Drive, Atlanta, Ga. 30340 |
|---|---|---|
| [21] | Appl. No. | 861,337 |
| [22] | Filed | Sept. 26, 1969 |
| [45] | Patented | Aug. 31, 1971 |

[54] SIDE SPRAY NOZZLES
2 Claims, 5 Drawing Figs.

[52] U.S. Cl. .................................................. 239/276,
239/587, 239/595, 239/598
[51] Int. Cl. .................................................. B05b 1/04,
B05b 15/08
[50] Field of Search .......................................... 239/276,
389, 587, 594, 595, 597, 599, 598, DIG. 1

[56] References Cited
UNITED STATES PATENTS

| 1,158,218 | 10/1915 | Holz ........................... | 239/595 |
| 2,657,096 | 10/1953 | Holmes ....................... | 239/276 |
| 3,241,772 | 3/1966 | Thompson................... | 239/587 X |
| 3,467,316 | 9/1969 | Hancock..................... | 239/594 |

*Primary Examiner*—Richard A. Schacher
*Assistant Examiner*—Reinhold W. Thieme
*Attorney*—Newton, Hopkins and Ormsby ABSTRACT: A side spray nozzle for connection to a water hose for delivering a fan-shaped spray including a nozzle head defining a radially extending discharge passage bordered by a pair of fan-shaped lips defining a thin slot therebetween communicating with the discharge passage to cause the water issuing therethrough to assume a fan-shape. A spike is provided which is selectively positionable with respect to the nozzle head for selectively maintaining the angle of the slot therein when the spike is embedded in the ground.

PATENTED AUG 31 1971  3,602,433

INVENTOR
ODEN (NMI) PROCTOR
BY: Newton, Hopkins, & Ormsby
ATTORNEYS

SIDE SPRAY NOZZLES

This invention relates to a sprinkler of the type designed for attachment to a garden hose for use in watering lawns, shrubbery, and various other kinds of herbage wherein the spray is directed from a side at right angles to the delivery portion of the hose.

It is an object of the invention to provide a simplified means for confining the spray delivered from the hose to a predetermined ground area desired to be moistened, or to direct the spray only upon the particular herbage which it is desired to have sprayed, making a definite straight border line of demarcation between the watered and unwatered areas, thus avoiding placing the hose in beds of flowers or of tender plants that might be disarranged or injured by allowing any portion of the hose resting upon them or by any swinging of the hose under the urge of the water pressure. The invention also pertains to a device for preventing the spray from falling upon ground areas or plants which it is desired to keep in a dry condition while applying water to other areas adjacent to them in a fan-shaped stream.

A more specific object is to provide for delivering a segmentally fan-shaped stream of water to a corner portion of a lot or plot of ground in a more precise and satisfactory manner.

A further object is to furnish improved, exceedingly simple means for supporting the sprinkler nozzle in its operative position in such a manner that it can be quickly and easily adjusted in the desired rotational position and then be securely clamped in such position.

A still further object relates to simplifying manufacture and lessening cost thereof in the production of the type of sprinkler to which the invention pertains.

A yet further object is to provide, in a nozzle of the type which produces a flat spray, means for adjusting the attached nozzle to the right and left of the axis of the supply conduit through any desired angle of spray delivery while maintaining the direction of the spray substantially transversely of the centerline of the hose.

Other objects, advantages, and features of the invention will hereinafter appear.

Referring to the accompanying drawings, which illustrate what are at present deemed to be preferred embodiments of the invention, FIG. 1 is a perspective view of the device showing the same in its operative position in a garden and adjusted to deliver the spray in a substantially vertically upward direction.

Figure 1:
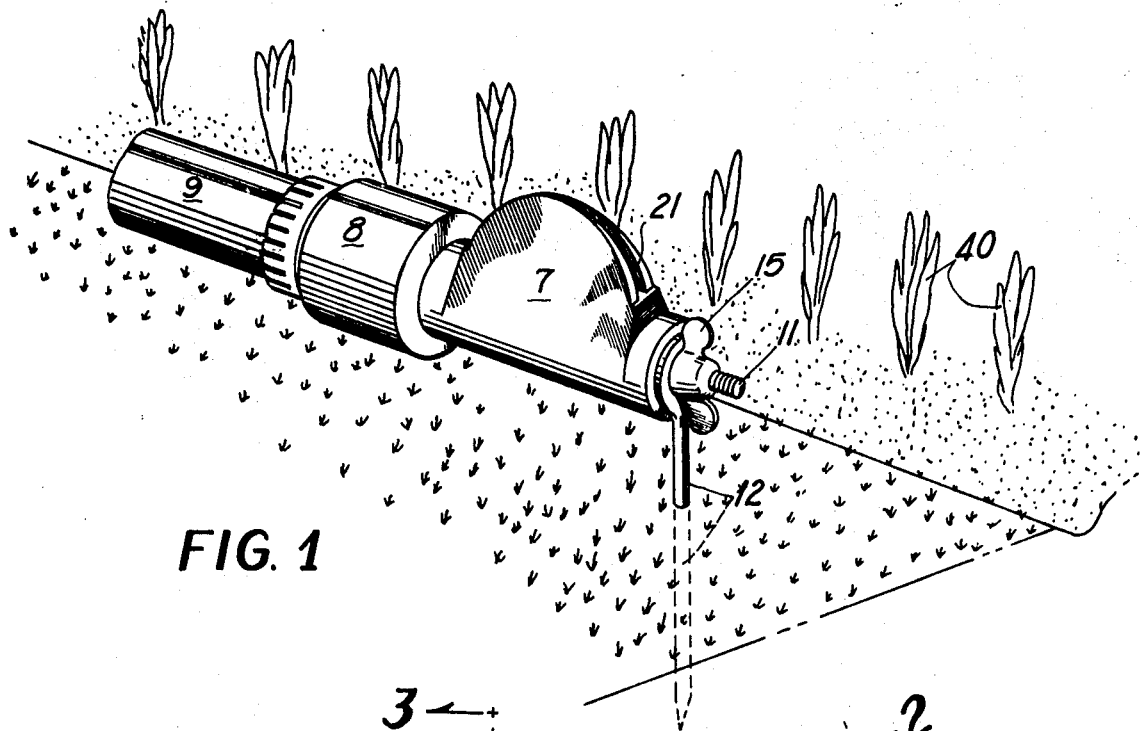
Figure 2:
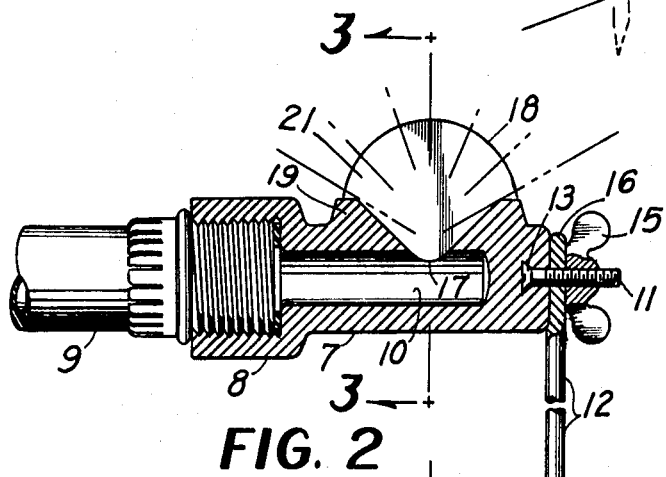
FIG. 2 is a vertical midsection of the device positioned as shown in FIG. 1, the plane of section being indicated by the line 2—2 on FIG. 3.
Figure 3:
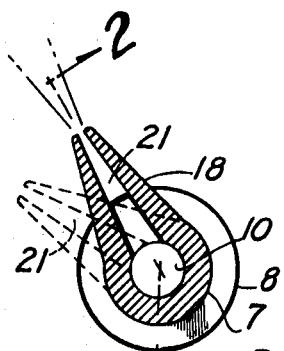
FIG. 3 is a cross section on line 3—3 of FIG. 2. In this view the lower dotted lines indicate a different rotational adjustment of the nozzle.

Referring in detail to the drawings, the sprinkler head 7 is shown furnished at one end with a conventional coupling extension 8 whereby it is coupled to the garden hose 9. Said sprinkler head consists of an elongated metal body having within it a longitudinal chamber 10 to which the liquid is supplied under pressure from the hose 9.

The end portion of the sprinkler body 7, which is farthest from the connection 8, has embedded within it a pin 11 whereby said sprinkler head is fastened in a rotationally adjustable manner to the upper portion of a spike 12, the lower portion of said spike being pointed to facilitate its insertion into the ground. The combination of the sprinkler body 7 and its embedded pin 11 permits the use of a softer metal in the nozzle body than is used for the other metal parts of the device.

By preference, and as shown, said pin 11 consists of a screw having a head 13 which is embedded within the end portion of the nozzle body at the time the latter is cast, the threaded portion of the screw being allowed to project axially from the nozzle body in order to have screwed upon it a winged nut 15. The spike 12 is furnished with an apertured flattened upper end portion 16 through which said screw is projected, whereupon the nozzle body is adjusted to the desired rotational position in relation to the spike, and then the nut is screwed down against the spike thereby firmly maintaining the nozzle head in its adjusted position.

From the nozzle chamber 10 leads a radial discharge passage 17, there being at each side of said passage a longitudinal extending, radially directed, fan-shaped lip 18 whereby the stream issuing from said passage is flattened into a segmental fan-shape. That side portion of the nozzle body 7 which is provided with the outlet passage 17 is thickened at 19, and through this thickened part of the nozzle body is cut a slot 21 which lengthens as it extends outwardly, but at the same time contracts somewhat as to its width. The outlet path 17 directs the water outwardly from the nozzle along a path generally transversely of the centerline of the hose.

Figure 4:
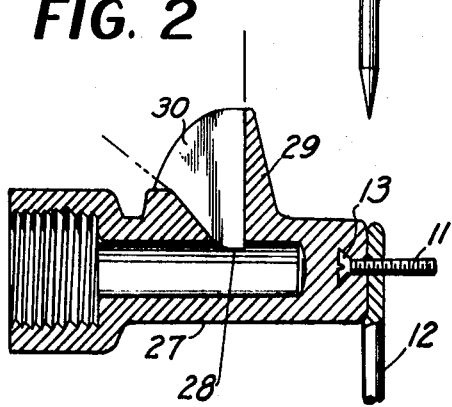
FIG. 4 is a sectional view showing the sprinkler head per se in a modified form, the plane of section being indicated by the line 4—4 on FIG. 5.
Figure 5:
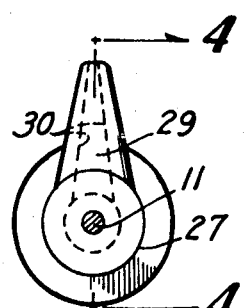
FIG. 5 is an end elevation of the structure shown in FIG. 4 looking thereat from right to left, the spike being omitted.

In FIG. 4 is shown a modification wherein the nozzle body 27 is of the same general shape and is combined with the screw 11 and spike 12, but is furnished with a modified discharge passage 28 that is restricted in its length by means of a stop wall 29 along its outer end, so that the stream which is discharged from the nozzle when the device is in its operative position, is directed upwardly and also back toward the hose, but is not allowed to moisten the soil beyond the closed end of the nozzle. Accordingly the segmental lips 30 of FIG. 4 are directed only upwardly and toward the intake end of the nozzle.

In both forms of the invention, segmentally fan-shaped lips are provided at each side of the issuing stream; and these lips converge toward their outer edges so that the stream is thinnest along the line of its issuance from the nozzle.

In the use of the invention, as is illustrated in FIG. 1, when it is desired to water a strip of ground lying beside a row of delicate plants 40, the hose is laid close to said row in a direction parallel therewith and the nozzle body is adjusted to direct the stream vertically, or nearly so, thus watering the soil close to said row of plants without its being necessary to lay any part of the hose or of the nozzle body across said plants; and without placing the hose in a bent position adjacent to the nozzle.

It should be understood that the present disclosure is for the purpose of illustration only, and that this invention includes all modifications and equivalents which fall within the scope thereof.

I claim:

1. A sprinkler for use with a hose for delivering a stream of water under pressure comprising an integral elongated nozzle body of generally cylindrical form, said body having a nozzle chamber extending longitudinally thereof, one side of the body being thickened, a radial discharge passage extending outwardly from the nozzle chamber through said thickened side of the body, two radially directed flat fan-shaped lips extending longitudinally of the body, one of each side of the passage, said lips being formed and spaced to provide a segmental fan-shaped passage which tapers outwardly in width, an opening at one end of said nozzle body for connection with a hose, said opening communicating with said nozzle chamber, the other end of said nozzle body being closed, a pointed spike pivotally mounted on the closed end of said nozzle body for movement about an axis extending longitudinally of said body, and means for holding said spike in adjusted position, whereby, when the spike is secured in the desired position and thrust into the ground, the fan-shaped opening will be placed at the desired angle with respect to a horizontal position.

2. A sprinkler as in claim 1, wherein a screw threaded member projects from the closed end of the nozzle body, the spike is provided with a flattened head having an aperture adapted to receive said screw threaded member, and a nut is provided for clamping said apertured head against said body in adjusted position.